(12) United States Patent
Cromer et al.

(10) Patent No.: US 7,688,779 B2
(45) Date of Patent: Mar. 30, 2010

(54) HANDLING THE USE OF MULTIPLE 802.11N CHANNELS IN A LOCATION WHERE THERE ARE A SMALL NUMBER OF AVAILABLE CHANNELS

(75) Inventors: Daryl Cromer, Cary, NC (US); Howard Jeffrey Locker, Cary, NC (US); Raymond Gary Octaviano, II, Durham, NC (US); Philip John Jakes, Durham, NC (US)

(73) Assignee: Lenovo Singapore Pte. Ltd, Singapore (SG)

( * ) Notice: Subject to any disclaimer, the term of this patent is extended or adjusted under 35 U.S.C. 154(b) by 787 days.

(21) Appl. No.: 11/383,519

(22) Filed: May 16, 2006

(65) Prior Publication Data

US 2007/0268872 A1    Nov. 22, 2007

(51) Int. Cl.
*H04Q 7/00* (2006.01)
(52) U.S. Cl. .................. 370/328; 370/331; 370/338; 455/436; 455/450
(58) Field of Classification Search .............. 370/331, 370/32, 328, 338; 455/436, 450
See application file for complete search history.

(56) References Cited

U.S. PATENT DOCUMENTS

| 5,822,361 | A | 10/1998 | Nakamura et al. | 375/202 |
|---|---|---|---|---|
| 6,636,737 | B1 | 10/2003 | Hills et al. | 455/450 |
| 6,714,605 | B2 | 3/2004 | Sugar et al. | 375/340 |
| 6,754,176 | B1 | 6/2004 | Gubbi et al. | 370/230 |
| 6,879,600 | B1 * | 4/2005 | Jones et al. | 370/466 |
| 2002/0021685 | A1 | 2/2002 | Sakusabe | 370/338 |
| 2004/0013168 | A1 | 1/2004 | Haines et al. | 375/132 |
| 2004/0203398 | A1 | 10/2004 | Durrant | 455/63.1 |
| 2004/0246929 | A1 | 12/2004 | Beasley et al. | 370/335 |
| 2005/0136927 | A1 * | 6/2005 | Enzmann | 455/436 |
| 2006/0227731 | A1 * | 10/2006 | Shun et al. | 370/310 |
| 2007/0206696 | A1 * | 9/2007 | Su | 375/267 |

FOREIGN PATENT DOCUMENTS

WO    WO 01/84789    11/2001

* cited by examiner

*Primary Examiner*—Danh C Le
(74) *Attorney, Agent, or Firm*—Winstead PC

(57) ABSTRACT

A method, computer program product and system for handling the use of multiple 802.11n channels in a location where there are a small number of available channels. An access point ("access point A") having a client ("client A") located solely within its coverage area and another client ("client B") located within its coverage area and a coverage area of an adjacent access point ("access point B") may receive a request to hold back 802.11n traffic from client B. Client B sends such a request since it is prevented from communicating with access point B using the 802.11n standard due to the interference from access point A communicating with client A using the 802.11n standard. As a result, access point A switches its standard of operation from using the 802.11n standard to communicate with client A to a standard that uses a bandwidth of 22 MHz (e.g., 802.11b, 802.11a, 802.11g standards).

18 Claims, 6 Drawing Sheets

HANDLING THE USE OF MULTIPLE 802.11N CHANNELS IN A LOCATION WHERE THERE ARE A SMALL NUMBER OF AVAILABLE CHANNELS

TECHNICAL FIELD

The present invention relates to the field of wireless communication, and more particularly to handling the use of multiple 802.11n channels in a location where there are a small number of available channels.

BACKGROUND INFORMATION

The current development towards truly mobile computing and networking has brought on the evolvement of various access technologies which provide the users with access to the Internet when they are outside their own home network. At present, wireless Internet access is typically based on either Wireless LAN (WLAN) technology or mobile networks, or both.

Wireless LAN systems are typically extensions of a wired network, providing mobile users with wireless access to the wired network. In wireless LAN technology, two basic network topologies are available for network configuration: an ad-hoc network and an infrastructure network. An ad-hoc network is formed by two or more independent mobile terminals (commonly referred to as "clients") without the services of a base station, i.e., in an ad-hoc network the terminals communicate on a peer-to-peer basis. An ad-hoc network is normally formed for temporary purposes. The infrastructure network, in turn, comprises one or more wireless base stations, called access points, which form part of the wired infrastructure. In this type of network, all traffic goes through the access points, regardless of whether the traffic is between two terminals or a terminal and the wired network, i.e., the mobile terminals do not communicate on a peer-to-peer basis. The mobile terminals are provided with wireless LAN cards, whereby they can access the wired network, such as the Internet, through said access points, which are mainly located in various hot spots, such as airports, convention centers, railway stations, or shopping malls.

The Institute for Electrical and Electronics Engineers (IEEE) has developed a set of Wireless LAN standards for over-the-air modulation techniques used in Wireless LAN systems. These standards are referred to as "IEEE 802.11" (commonly referred to as the "Wi-Fi" standard). The 802.11 standards are actually a family of versions that have developed over the years since 1997. For example, the original version of the standard IEEE 802.11 (commonly denoted as "802.11") was released in 1997 followed by amendments to the standard IEEE 802.11, which are indicated by "802.11b", "802.11a" and "802.11g." These standards (802.11b, 802.11a and 802.11g) use either the 2.4 gigahertz (GHz) band or the 5 GHz band. Further, these standards (802.11b, 802.11a and 802.11g) divide the frequency spectrum into a particular number (e.g., 14) of overlapping, staggered channels. Only selected channels (e.g., channels 1, 6 and 11) are used by these standards, which are spaced apart from one another in a manner that reduces the likelihood of interference. Typically, these standards (802.11b, 802.11a and 802.11g) use a bandwidth of 22 megahertz (MHz). That is, the channels that they use are 22 MHz wide channels.

In January 2004, IEEE announced that it had formed a new 802.11 Task Group (TGn) to develop a new amendment to the 802.11 standard for Wireless LAN. The new standard is referred to as "802.11n." 802.11n builds upon previous 802.11 standards by adding multiple-input multiple-output (MIMO), which uses multiple transmitter and receiver antennas to allow for increased data throughput through spatial multiplexing and increased range by exploiting the spatial diversity, perhaps through coding schemes like Alamouti coding. 802.11n, by definition, must be backward compatible with the prior versions 802.11b, 802.11a and 802.11g, which are defined to use 22 MHz wide channels in either the 2.4 GHz band or the 5 GHz band. There are two competing proposals for meeting the 802.11n specifications: WWiSE (World-Wide Spectrum Efficiency) and TGn Sync. TGn Sync has proposed using 40 MHz wide channels in order to meet the 802.11 specifications. That is, TGn Sync has proposed using 40 MHz wide channels in order to handle the additional data being transmitted and received. However, by using 40 MHz wide channels instead of using 22 MHz wide channels in the 2.4 GHz band, interference (illustrated and discussed further below in connection with FIG. 1) will result between multiple channels being used to support the 40 MHz wide channels. Because there will be interference between the multiple channels being used to support the 40 MHz wide channels, there may be interference between mobile terminals (clients) accessing the Wireless LAN through adjacent access points where the clients are in the same coverage area of a particular access point. Such interference resulting from having 40 MHz wide channels is illustrated in FIG. 1.

FIG. 1 is a plot of frequency versus radio strength illustrating the use of both 22 MHz wide channels and 40 MHz wide channels for the 802.11b, 802.11a, 802.11g and 802.11n standards. As stated above, 802.11b, 802.11a and 802.11g standards use 22 MHz wide channels. FIG. 1 illustrates these standards using channels 1, 6 and 11 in the 2.4 GHz (2400 MHz) band where each of these channels is 22 MHz wide as indicated by the non-shaded area. In particular, these standards may use channel 1 (centered at 2412 MHz) with a bandwidth of 22 MHz ranging from 2401 MHz to 2423 MHz. These standards may further use channel 6 (centered at 2437 MHz) with a bandwidth of 22 MHz ranging from 2226 MHz to 2448 MHz. These standards may further use channel 11 (centered at 2462 MHz) with a bandwidth of 22 MHz ranging from 2451 MHz to 2473 MHz.

As further stated above, the 802.11n standard is proposed to use 40 MHz wide channels. FIG. 1 illustrates the use of 802.11n standard using channels 3 and 8 (use these channels in order to support a bandwidth of 40 MHz) that are 40 MHz wide as indicated by the shaded area. As illustrated in FIG. 1, there is an overlapping of channels 3 and 8 (near channel 6) when 40 MHz wide channels are used in the 802.11n standard. However, there is no overlapping of channels 1, 6 and 11 when 22 MHz wide channels are used for the 802.11b, 802.11a and 802.11g standards. Hence, there will be interference between multiple 802.11n channels if 40 MHz wide channels are used using the same band as the previous 802.11b, 802.11a and 802.11g standards. Because there will be interference between multiple 802.11n channels, there may be interference between mobile terminals (clients) accessing the Wireless LAN through adjacent access points using the 802.11n standard where the clients are in the same coverage area of a particular access point.

Therefore, there is a need in the art for handling the interference between multiple 802.11n channels in a location where there are a small number of available channels.

SUMMARY

The problems outlined above may at least in part be solved in some embodiments by having an access point ("access point A") switch its standard of operation from using the 802.11n standard to communicate with a client ("client A") solely within its coverage area to a standard that uses a bandwidth of 22 MHz (e.g., 802.11b, 802.11a, 802.11g standards) when there is another client ("client B") within its coverage area as well as the coverage area of an adjacent access point ("access point B") using the 802.11n standard. By switching to a 22 MHz wide channel to communicate with client A, client B is now able to communicate with access point B using the 802.11n standard without interference from the communication between access point A and client A.

In one embodiment of the present invention, a method for handling the use of multiple 802.11n channels in a location where there are a small number of available channels may comprise the step of tracking a number of requests to hold back 802.11n traffic received over a designated period of time from one or more clients located in an overlapping coverage area between access points. The method may further comprise switching a standard of operation from using a 802.11n standard to a standard that uses a lower bandwidth (e.g., bandwidth of 22 MHz) if the number of requests to hold back 802.11n traffic exceeds a threshold.

The foregoing has outlined rather generally the features and technical advantages of one or more embodiments of the present invention in order that the detailed description of the invention that follows may be better understood. Additional features and advantages of the invention will be described hereinafter which may form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

The present invention comprises a method, computer program product and system for handling the use of multiple 802.11n channels in a location where there are a small number of available channels. In one embodiment of the present invention, an access point ("access point A") having a client ("client A") located solely within its coverage area and another client ("client B") located within its coverage area and a coverage area of an adjacent access point ("access point B") may receive a request to hold back 802.11n traffic from client B. Client B may send such a request since it may be prevented from communicating with access point B due to the interference from access point A communicating with client A using the 802.11n standard (i.e., from overlapping 802.11n channels). As a result, access point A may switch its standard of operation from using the 802.11n standard to communicate with client A to a standard (e.g., 802.11b, 802.11a, 802.11g standards) that uses a lower bandwidth (e.g., 22 MHz wide channel). By switching to a 22 MHz wide channel to communicate with client A, client B is now able to communicate with access point B using the 802.11n standard without interference from the communication between access point A and client A.

Even though the following discusses having the access point switch to one of the 802.11b, 802.11a and 802.11g standards that use 22 MHz wide channels to handle the interference between multiple 802.11n channels in a location where there are a small number of available channels, the principles of the present invention may be applied to having the access point switch to any standard that uses a channel bandwidth small enough to allow a client to communicate with an adjacent access point. It is further noted that a person of ordinary skill in the art would be capable of applying the principles of the present invention to having the access point switch to any standard that uses a channel bandwidth small enough to allow a client to communicate with an adjacent access point. Embodiments covering the access point switching to any standard that uses a channel bandwidth small enough to allow a client to communicate with an adjacent access point would fall within the scope of the present invention.

Figure 2:
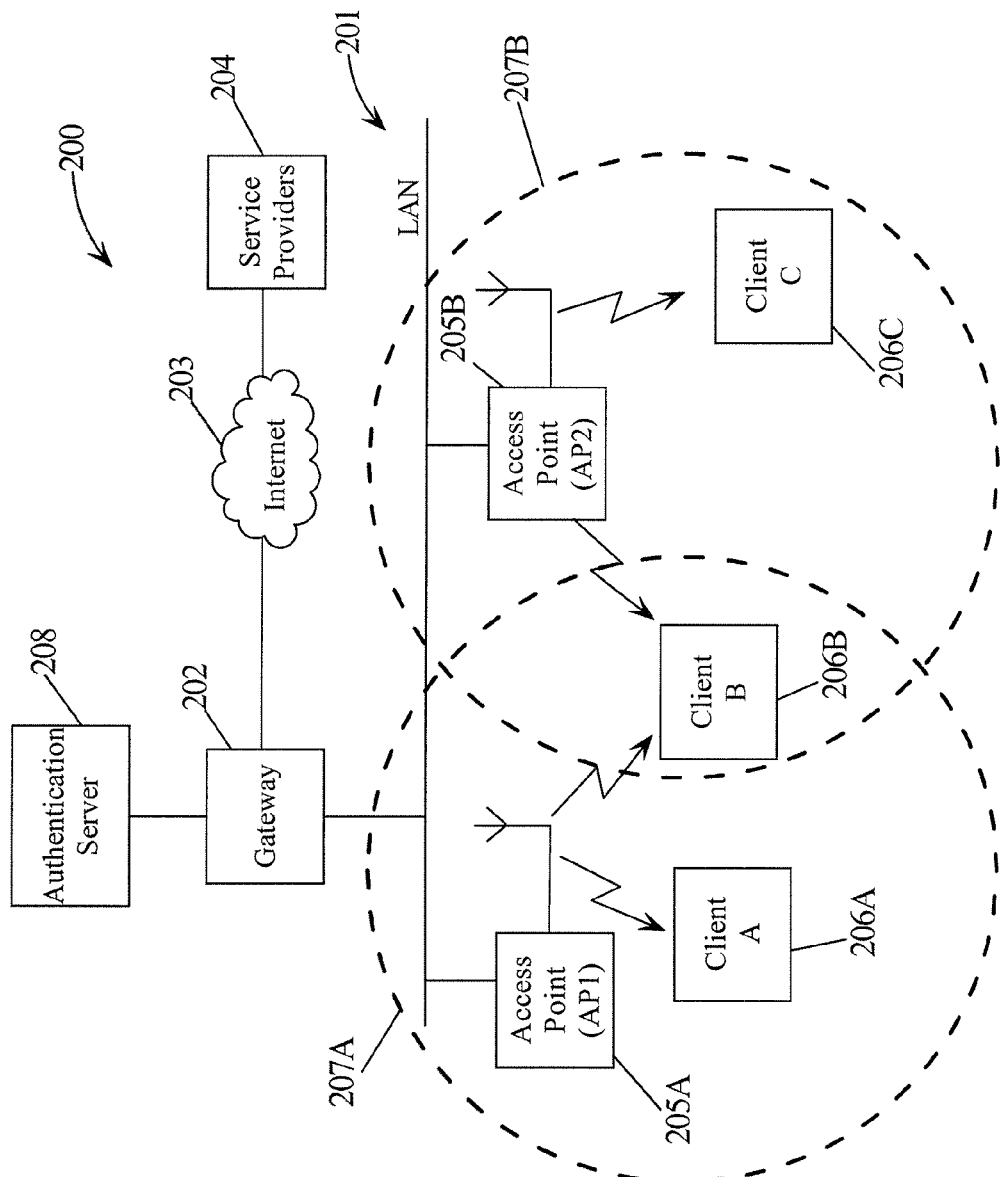
FIG. 2 illustrates a typical communication system according to an embodiment of the present invention.

FIG. 2—Communication System

FIG. 2 illustrates a communication system 200 according to an embodiment of the present invention. Communication system 200 includes one or more Wireless LAN networks 201, each connected by means of a gateway 202 to another network, such as the Internet 203, which contains service providers 204. Each Wireless LAN network 201 may include one or more access points 205A-B. Access points 205A-B may collectively or individually be referred to as access points 205 or access point 205, respectively. A more detail description of access point 205 is provided below in connection with FIG. 3. Access point 205A may be referred to as "AP1" and that access point 205B may be referred to as "AP2." Each access point 205 communicates wirelessly with the terminals or clients 205A-C within the coverage area, i.e., the cell, of access point 205. For example, access point 205A communicates wirelessly with clients 206A, 206B within a coverage area 207A. Similarly access point 205B communicates wirelessly with clients 206B, 206C within a coverage area 207B. In this manner, a bridge is effectively formed between clients 206A-C and wired network 201. Clients 206A-C may collectively or individually be referred to as clients 206 or client 206, respectively. Client 206A may be referred to as "Client A"; client 206B may be referred to as "Client B"; and client 206C may be referred to as "Client C." Wireless LAN network 201 may include any number of access points 205 and that the number of access points 205 presented in FIG. 2 is illustrative.

System 200 may further include an authentication server 208 of Wireless LAN network 201 used to authenticate the users of clients 206 logging on Wireless LAN network 201. Authentication server 208 is connected to gateway 202 through a secured connection, which is typically a TCP/IP connection established through an operator network or through Internet 203.

Communication system 200 may include any number of gateways 202, Wireless LANs 201, access points 205, clients 206, etc. Communication system 200 may include other components that were not depicted for ease of understanding and that the scope of the present invention is not limited to the embodiment illustrated in FIG. 2

Figure 3:
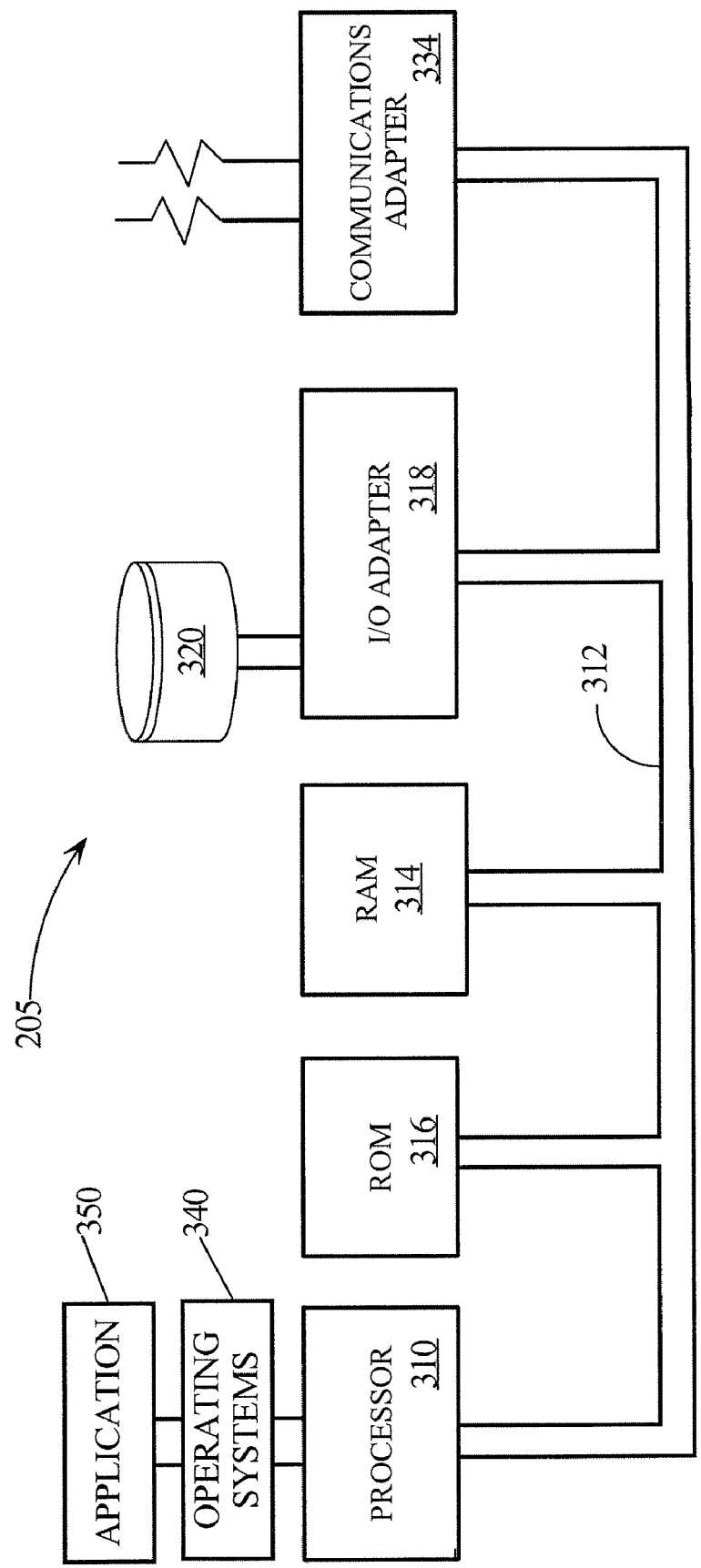
FIG. 3 is a hardware configuration of an access point in accordance with an embodiment of the present invention.
Figure 4:
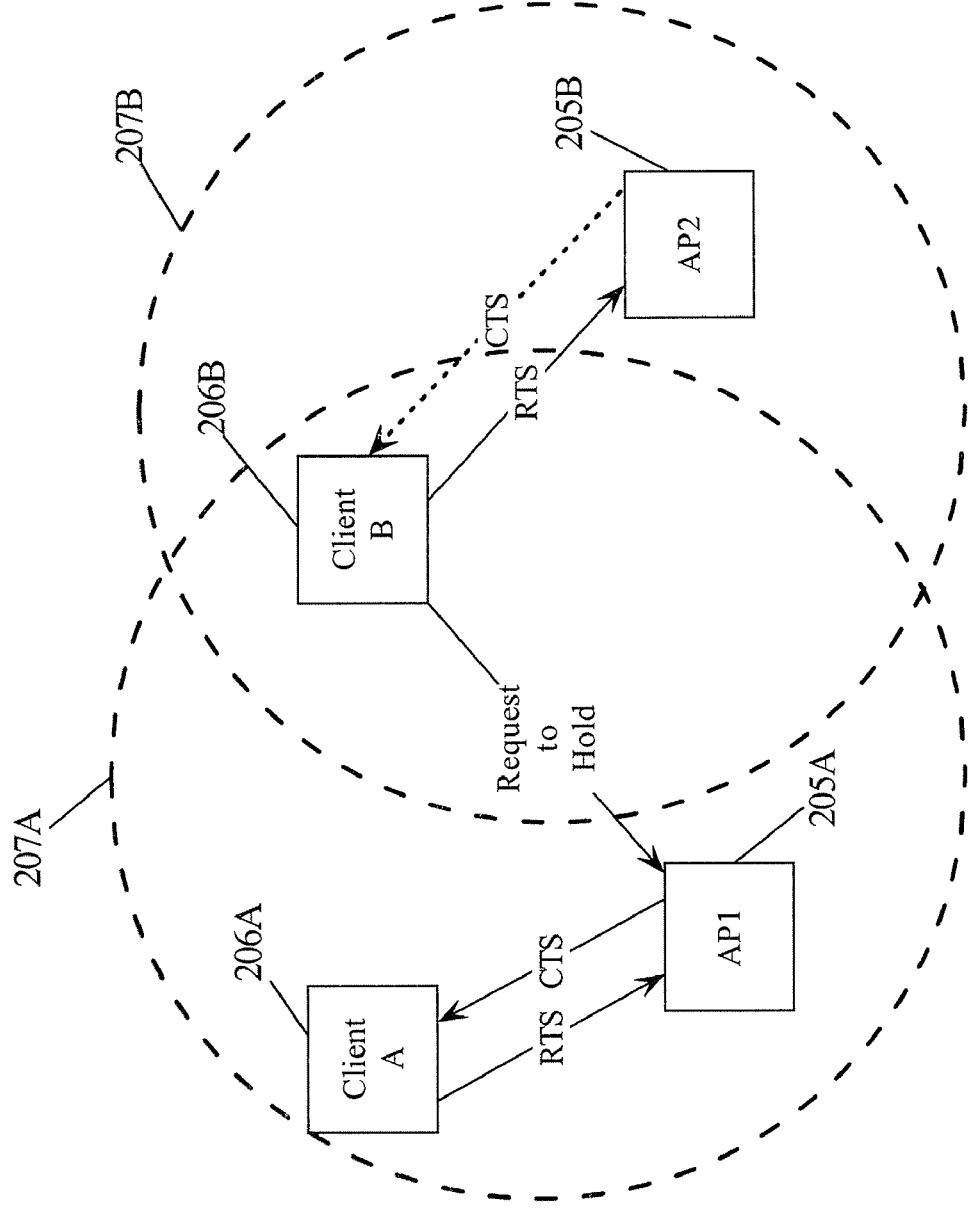
FIG. 4 is a diagram of the interaction between multiple clients and multiple access points where the multiple clients are located within the coverage area of an access point and where one of the multiple clients is also within the coverage area of an adjacent access point in accordance with an embodiment of the present invention.
Figure 5:
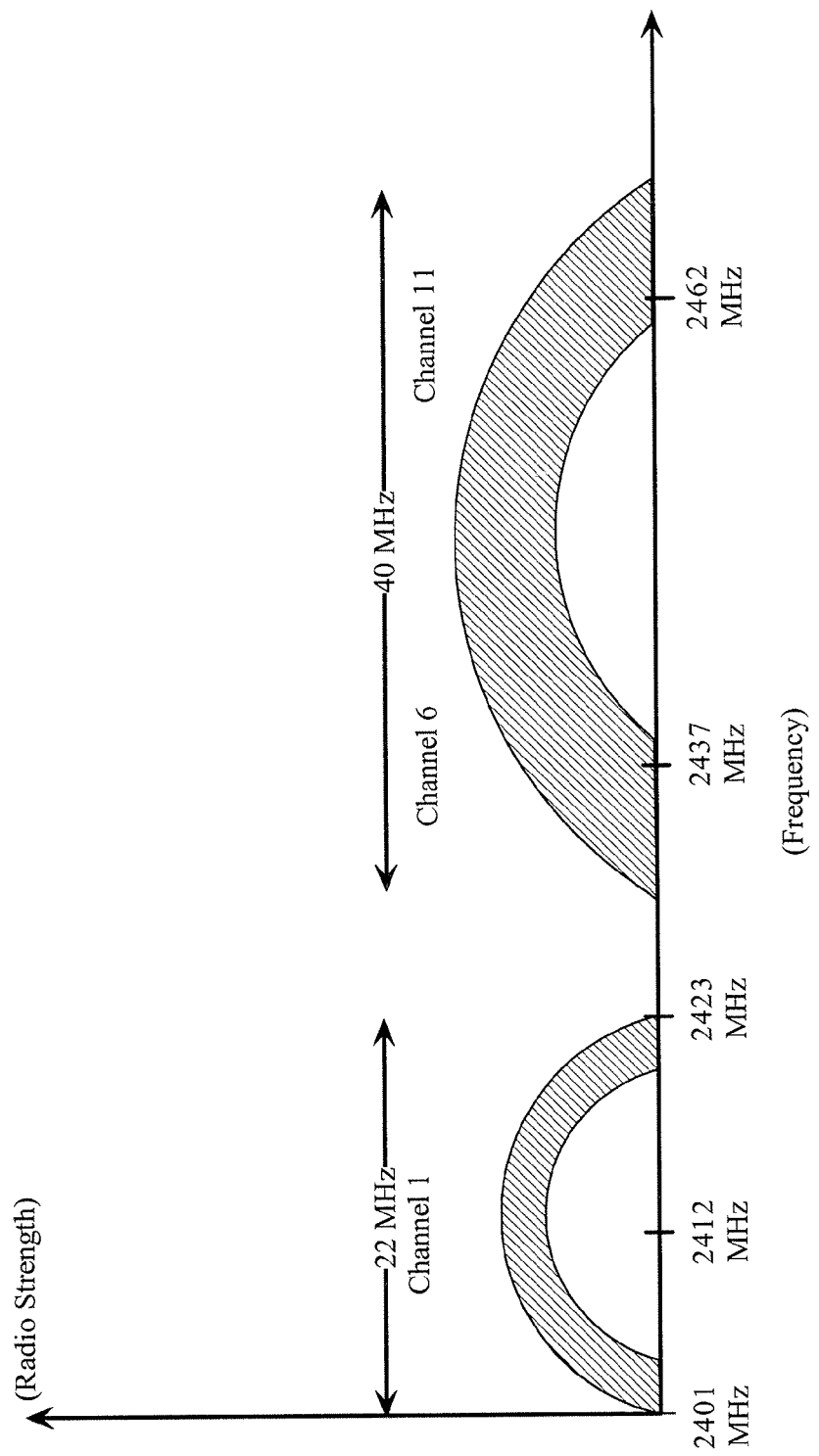
FIG. 5 is a plot of frequency versus radio strength illustrating the handling of the interference between multiple 802.11n channels in accordance with an embodiment of the present invention.
Figure 6:
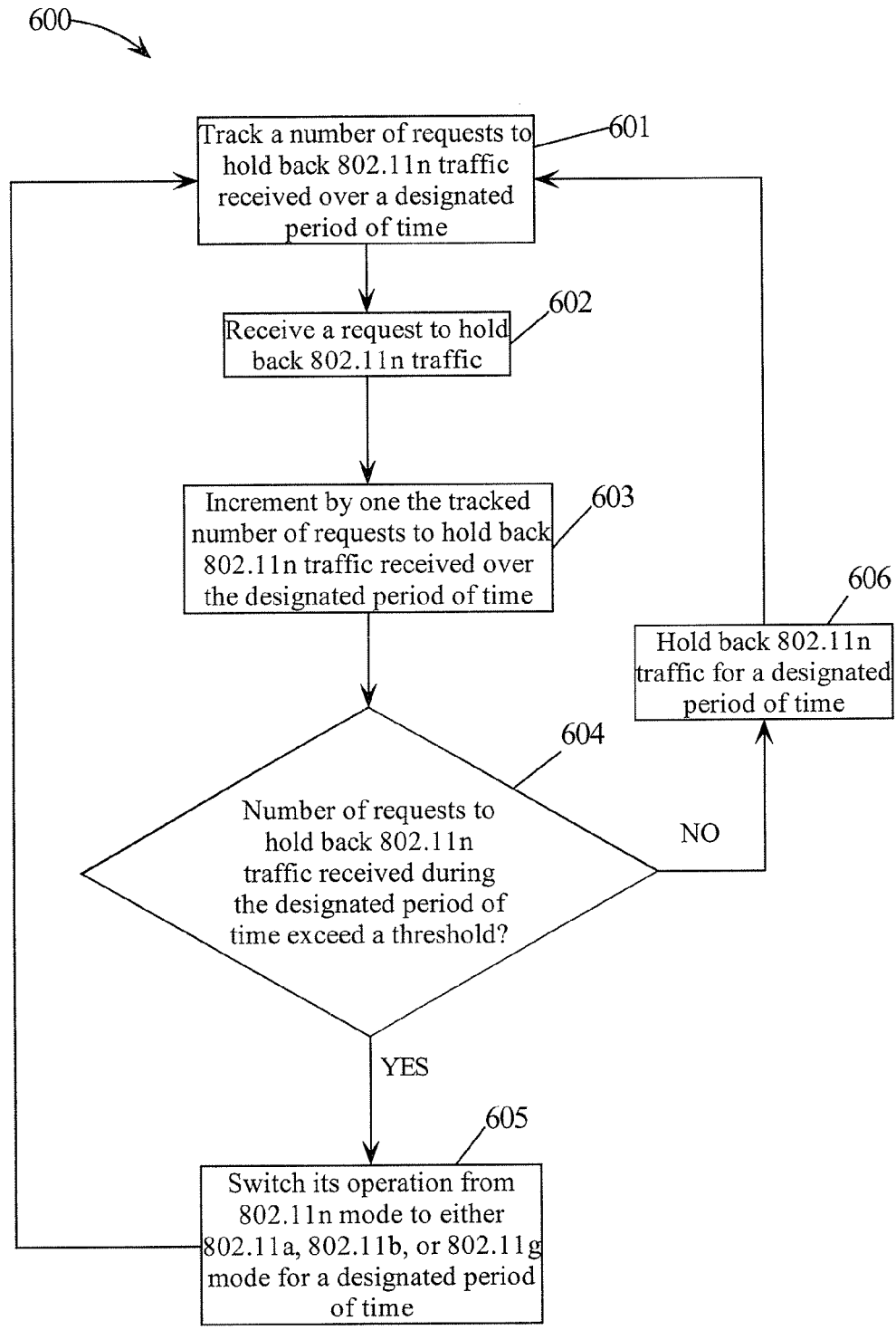
FIG. 6 is a flowchart of a method for handling the use of multiple 802.11n channels in a location where there are a small number of available channels in accordance with an embodiment of the present invention.

As stated in the Background Information section, the 802.11n standard is proposed to use 40 MHz wide channels. As a result, there will be interference between multiple 802.11n channels if 40 MHz wide channels are used using the same band as the previous 802.11b, 802.11a and 802.11g standards. Because there will be interference between multiple 802.11n channels, there will be interference between mobile terminals (clients) accessing the Wireless LAN through the same access point using the 802.11n standard. Therefore, there is a need in the art for handling the interference between multiple 802.11n channels if 40 MHz wide channels are used using the same band as the previous 802.11b, 802.11a and 802.11g standards. That is, there is a need in the art for handling the interference between multiple 802.11n channels in a location where there are a small number of available channels. The interference between multiple 802.11n channels in a location where there are a small number of available channels may be handled by access points 205 switching its mode of operation to either the 802.11b, 802.11a or 802.11g standard under certain situations thereby using a 22 MHz wide channel instead of a 40 MHz wide channel as discussed below in association with FIGS. 3-6. FIG. 3 illustrates the hardware configuration of access points 205. FIG. 4 illustrates the interaction between access points 205 and clients 206 within the coverage area of those access points 205 in connection with handling the interference between multiple 802.11n channels. FIG. 5 is a plot diagram illustrating the elimination of the interference between multiple 802.11n channels. FIG. 6 is a flowchart of a method for handling the interference between multiple 802.11n channels in a location where there are a small number of available channels.

FIG. 3—Hardware Configuration of Access Point

FIG. 3 illustrates a hardware configuration of an access point 205 (FIG. 2) which is representative of the hardware environment for practicing embodiments of the present invention. Access point 205 may have a processor 310 coupled to various other components by system bus 312. An operating system 340 may run on processor 310 and provide control and coordinate the functions of the various components of FIG. 3. An application 350 in accordance with the principles of the present invention may run in conjunction with operating system 340 and provide calls to operating system 340 where the calls implement the various functions or services to be performed by application 350. Application 350 may include, for example, an application for handling the use of multiple 802.11n channels in a location where there are a small number of available channels as discussed below in association with FIGS. 4-6.

Read-Only Memory (ROM) 316 may be coupled to system bus 312 and include a basic input/output system ("BIOS") that controls certain basic functions of access point 205. Random access memory (RAM) 314 and disk adapter 318 may also be coupled to system bus 312. Software components, including operating system 340 and application 350, may be loaded into RAM 314 which may be access point's 205 main memory for execution. Disk adapter 318 may be an integrated drive electronics ("IDE") adapter that communicates with a disk unit 320, e.g., disk drive. The application for handling the use of multiple 802.11n channels in a location where there are a small number of available channels, as discussed below in association with FIGS. 4-6, may reside in either disk unit 320 or in application 350.

Referring to FIG. 3, access point 205 may further comprise a communications adapter 334 coupled to bus 312. Communications adapter 334 may interconnect bus 312 with an outside network (e.g., Local Area Network (LAN), Internet 203 of FIG. 2), thereby enabling clients 206 (FIG. 2) to communicate with other such systems.

Implementations of the invention include implementations as a computer system programmed to execute the method or methods described herein, and as a computer program product. According to the computer system implementations, sets of instructions for executing the method or methods may be resident in the random access memory 314 of one or more computer systems configured generally as described above. Until required by access point 205, the set of instructions may be stored as a computer program product in another computer memory, for example, in disk unit 320. Furthermore, the computer program product may also be stored at another computer and transmitted when desired to the user's workstation by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change.

A diagram illustrating the interaction between access points 205, whose hardware configuration was discussed above, and clients 206 within the coverage area of those access points 205 in connection with handling the interference between multiple 802.11n channels is discussed below in association with FIG. 4.

FIG. 4—Diagram of Interaction Between Access Points and Clients

FIG. 4 is a diagram illustrating how an access point 205 (FIGS. 2 and 3) handles interference between multiple 802.11n channels in a location where there are a small number of available channels in accordance with an embodiment of the present invention. Even though the discussion below focuses on access point 205A (FIG. 2) handling the interference between multiple 802.11n channels involving client 206B (FIG. 2) that the principles of the present invention discussed herein may apply to any access point 205. Further, the principles of the present invention discussed herein may apply to any client 206 located within multiple coverage areas.

Figure 1:
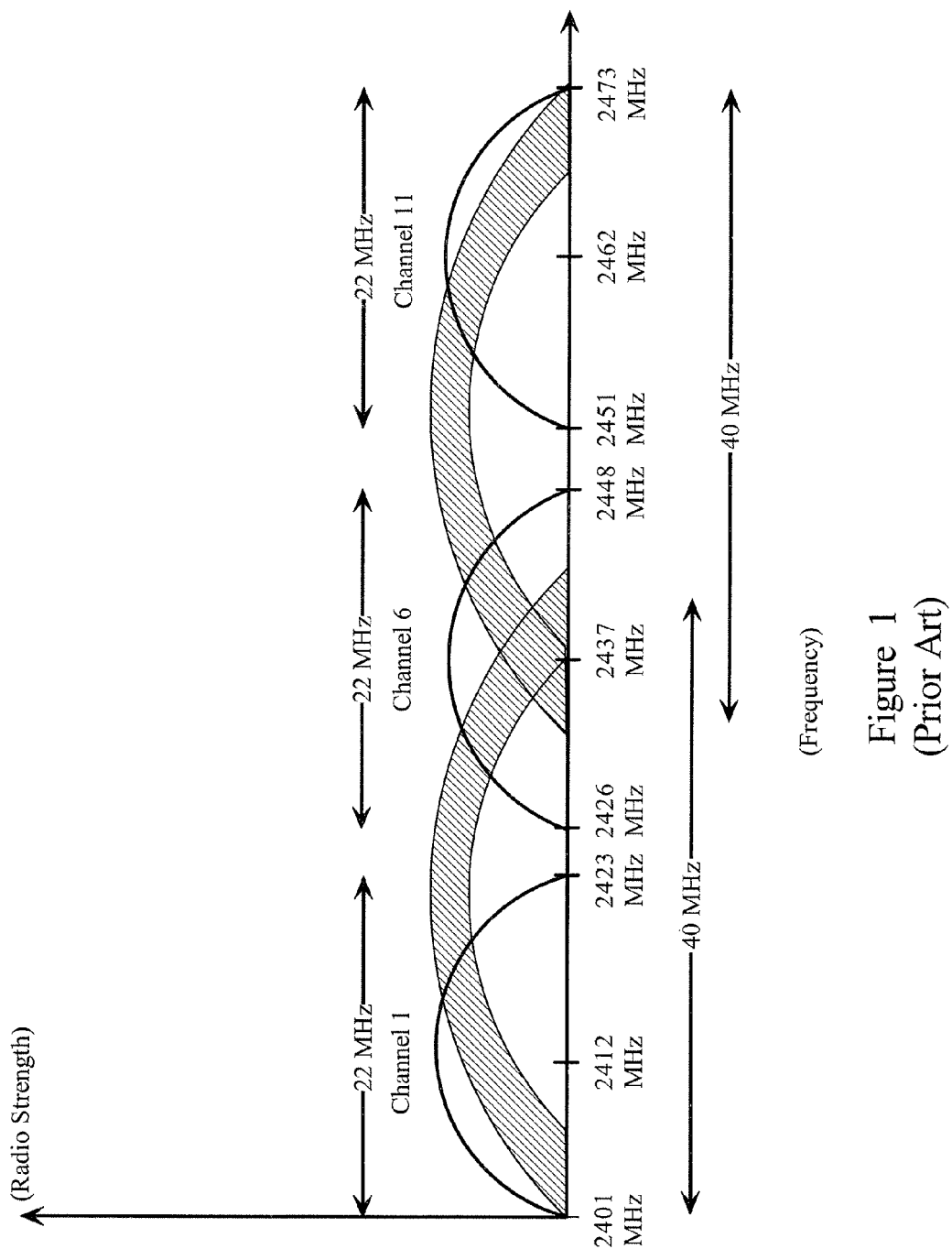
FIG. 1 is a plot of frequency versus radio strength illustrating the use of both 22 MHz wide channels and 40 MHz wide channels for the 802.11b, 802.11a, 802.11g and 802.11n standards.

Referring to FIGS. 2 and 4, client B 206B is located within coverage areas 207A, 207B of AP1 205A and AP2 205B, respectively. As also illustrated in FIGS. 2 and 4, client A 206A is located solely within coverage area 207A of AP1 205A. Since there are multiple clients 206 located within coverage area 207A of AP1 205A, there is a possibility of interference for the communication between client B 206B and AP2 205B as a result of the communication between client A 206A and AP1 205A where both AP1 205A and AP2 205B are using the 802.11n standard as illustrated in FIG. 1. For example, referring to FIGS. 1 and 4, if client A 206A accesses AP1 205A on channel 1 using the 802.11n standard and if client B 206B attempted to access AP2 205B on channel 13 using the 802.11n standard, then the connection between client B 206B and AP2 205B may suffer interference from the communication between client A 206A and AP1 205A since client B 206B is within coverage area 207A of AP1 205A. The connection between client B 206B and AP2 205B may suffer interference from the communication between client A 206A and AP1 205A because the 40 MHz wide channel being used by client A 206A would interfere with the 40 MHz wide channel being used by client B 206B as both channels are within coverage area 207A of AP1 205A. This is shown in FIG. 1 with the overlap of the 802.11n 40 MHz wide channels.

Referring to the illustration of FIG. 4, the interference described above may be detected by client B 206B by detecting a certain number of lost packets exceeding a threshold and by determining from channel scans that client B 206B is located in an area that has overlapping access point channels. As a result of the interface described above, client B 206B may be able to send a Request to Send (RTS) to AP2 205B but may not be able to receive a Clear to Send (CTS) from AP2 205B. The interference described above may be handled by AP1 205A by having client B 206B send a request to hold back 802.11n traffic to AP1 205A thereby allowing client B 206B to communicate with AP2 205B using the standard (RTS)/(CTS) mechanism.

AP1 205A is configured to track the number of requests to hold 802.11n traffic over a designated period of time (e.g., one minute). Upon receiving a request to hold back 802.11n traffic from client B 206B, AP1 205A may be further configured to increment the tracked number of requests to hold back 802.11n traffic received over the designated period of time. AP1 205A may then determine if the number of requests to hold back 802.11n traffic received during the designated period of time exceeds a threshold. If the number of requests to hold back 802.11n traffic received during the designated period of time exceeds the threshold, then AP1 205A switches its operation from using the 802.11n standard to using either the 802.11a, 802.11b or 802.11g standard which uses a 22 MHz wide channel. By AP1 205A using a 22 MHz wide channel in its communication with client A 206A, AP2 205B would then be able to use a 802.11n 40 MHz wide channel in its communication with client B 206B without interference from the communication between AP1 205A and client A 206A as illustrated in FIG. 5.

FIG. 5 is a plot of frequency versus radio strength illustrating the reduction in interference when AP1 205A uses a 22 MHz wide channel in its communication with client A 206A by using either the 802.11b, 802.11a or 802.11g standard as opposed to using the 802.11n standard in accordance with an embodiment of the present invention. Referring to FIG. 5, in conjunction with FIG. 4, AP1 205A uses a 22 MHz wide channel (e.g., channel 1) in its communication with client A 206A which does not interfere with the 40 MHz wide channel (e.g., channel 8) being used by client B 206B in its communication with AP2 205B. While the data rate exchange between client A 206A and AP1 205A is reduced by AP1 205A using a 22 MHz wide channel instead of a 40 MHz wide channel, client B 206B is now able to effectively communicate with AP2 205B using the 802.11n standard.

Returning to FIG. 4, if, however, the number of requests to hold back 802.11n traffic received during the designated period of time does not exceed the threshold, then AP1 205A may hold back 802.11n traffic and cease communication with client A 206A. In this manner, client B 206B will also be able to communicate with AP2 205B using the 802.11n standard.

A method for access point 205 (e.g., access point 205A) handling the use of multiple 802.11n channels in a location where there are a small number of available channels is provided below in connection with FIG. 6.

FIG. 6—Method for Handling the Use of Multiple 802.11n Channels

FIG. 6 is a flowchart of one embodiment of the present invention of a method 600 for handling the use of multiple 802.11n channels in a location where there are a small number of available channels.

Hereinafter, access point 205 refers to access point 205A and the "adjacent" access point 205 refers to access point 205B. Further, hereinafter, client 206 refers to client 206B and "another" or "other" client 206 refers to client 206A.

Referring to FIG. 6, in conjunction with FIGS. 2-5, in step 601, access point 205 tracks the number of requests to hold 802.11n traffic over a designated period of time (e.g., one minute).

In step 602, access point 205 receives a request to hold back 802.11n traffic from client 206. Client 206 within the coverage areas of multiples access points 205 (e.g., coverage areas 207A-B) may send a request to access point 205 to hold back 802.11n traffic if client's 206 communication with an adjacent access point is suffering interference based on the communication access point 205 has with another client 206 within its coverage area (e.g., coverage area 207A).

In step 603, access point 205 increments the tracked number of requests to hold back 802.11n traffic received over the designated period of time by one.

In step 604, access point 205 determines if the number of requests to hold back 802.11n traffic received during the designated period of time exceeds a threshold.

If the number of requests to hold back 802.11n traffic received during the designated period of time exceeds the threshold, then access point 205 switches its operation from using the 802.11n standard to using either the 802.11a, 802.11b or 802.11g standard, which uses a 22 MHz wide channel, for a designated period of time. By access point 205 using a 22 MHz wide channel in its communication with the other client 206 within its coverage area (e.g., coverage area 207A), the adjacent access point 205 would then be able to use a 802.11n 40 MHz wide channel in its communication with client 206 (referring to client 206 that requested access point 205 to withhold 802.11n traffic). Further, access point would still be able to communicate with client 206 located within its coverage area although at a reduced data rate.

After access point 205 switches its operation from using the 802.11n standard to using either the 802.11a, 802.11b or 802.11g standard for a designated period of time, access point 205 continues to track the number of requests to hold back 802.11n traffic received over a designated period of time and waits to receive a request to hold back 802.11n traffic in step 601. It is noted for clarity that the designated period of time for using either the 802.11a, 802.11b or 802.11g standard and the designated period of time for tracking the number of requests to hold back 802.11n traffic may not be the same time period.

If, however, the number of requests to hold back 802.11n traffic received during the designated period of time does not exceed the threshold, then access point 205 holds back 802.11n traffic for a designated period of time and ceases communication with client 206 located only within its coverage area (e.g., coverage area 207A). In this manner, client 206 (referring to client 206 that requested access point 205 to withhold 802.11n traffic) will also be able to communicate with the adjacent access point 205 using the 802.11n standard.

After access point 205 holds back 802.11n traffic for the designated period of time, access point 205 continues to track the number of requests to hold back 802.11n traffic received over a designated period of time and waits to receive a request to hold back 802.11n traffic in step 601. It is noted for clarity that the designated period of time for holding back 802.11n traffic and the designated period of time for tracking the number of requests to hold back 802.11n traffic may not be the same time period.

Method 600 may include other and/or additional steps that, for clarity, are not depicted. Method 600 may further be executed in a different order presented and that the order presented in the discussion of FIG. 6 is illustrative. Further, certain steps in method 600 may be executed in a substantially simultaneous manner.

Although the method, computer program product and system are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. Further, the headings are used only for organizational purposes and not meant to limit the scope of the description or claims.

The invention claimed is:

1. A method for handling the use of multiple 802.11n channels in a location where there are a small number of available channels, the method comprising the steps of:
   tracking a number of requests to hold back 802.11n traffic received over a designated period of time from one or more clients located in an overlapping coverage area between access points; and
   switching, by a processor of an access point, a standard of operation from using a 802.11n standard to a standard that uses a lower bandwidth if said number of requests to hold back 802.11n traffic exceeds a threshold.

2. The method as recited in claim 1 further comprising the steps of:
   receiving a request to hold back 802.11n traffic; and
   incrementing said tracked number of requests to hold back 802.11n traffic received over said designated period of time by one.

3. The method as recited in claim 2 further comprising the step of:
   comparing said incremented tracked number of requests to hold back 802.11n traffic received over said designated period of time to said threshold.

4. The method as recited in claim 3 further comprising the step of:
   switching said standard of operation from using said 802.11n standard to said standard that uses said lower bandwidth if said incremented tracked number of requests to hold back 802.11n traffic exceeds said threshold.

5. The method as recited in claim 1 further comprising the step of:
   holding back 802.11n traffic if said number of requests to hold back 802.11n traffic does not exceed said threshold.

6. The method as recited in claim 1, wherein said standard of operation is switched from said 802.11n standard to one of 802.11a standard, 802.11b standard and 802.11g standard if said number of requests to hold back 802.11n traffic exceeds said threshold.

7. A computer program product embodied in a computer readable medium for handling the use of multiple 802.11n channels in a location where there are a small number of available channels, comprising the programming steps of:
   tracking a number of requests to hold back 802.11n traffic received over a designated period of time from one or more clients located in an overlapping coverage area between access points; and
   switching a standard of operation from using a 802.11n standard to a standard that uses a lower bandwidth if said number of requests to hold back 802.11n traffic exceeds a threshold.

8. The computer program product as recited in claim 7 further comprising the programming steps of:
   receiving a request to hold back 802.11n traffic; and
   incrementing said tracked number of requests to hold back 802.11n traffic received over said designated period of time by one.

9. The computer program product as recited in claim 8 further comprising the programming step of:
   comparing said incremented tracked number of requests to hold back 802.11n traffic received over said designated period of time to said threshold.

10. The computer program product as recited in claim 9 further comprising the programming step of:
    switching said standard of operation from using said 802.11n standard to said standard that uses said lower bandwidth if said incremented tracked number of requests to hold back 802.11n traffic exceeds said threshold.

11. The computer program product as recited in claim 7 further comprising the programming step of:
    holding back 802.11n traffic if said number of requests to hold back 802.11n traffic does not exceed said threshold.

12. The computer program product as recited in claim 7, wherein said standard of operation is switched from said 802.11n standard to one of 802.11a standard, 802.11b standard and 802.11g standard if said number of requests to hold back 802.11n traffic exceeds said threshold.

13. A system, comprising:
    a memory unit operable for storing a computer program for handling the use of multiple 802.11n channels in a location where there are a small number of available channels;
    a processor coupled to said memory unit, wherein said processor, responsive to said computer program, comprises:
       circuitry for tracking a number of requests to hold back 802.11n traffic received over a designated period of time from one or more clients located in an overlapping coverage area between access points; and
       circuitry for switching a standard of operation from using a 802.11n standard to a standard that uses a lower bandwidth if said number of requests to hold back 802.11n traffic exceeds a threshold.

14. The system as recited in claim 13, wherein said processor further comprises:

circuitry for receiving a request to hold back 802.11n traffic; and circuitry for incrementing said tracked number of requests to hold back 802.11n traffic received over said designated period of time by one.

15. The system as recited in claim 14, wherein said processor further comprises:

circuitry for comparing said incremented tracked number of requests to hold back 802.11n traffic received over said designated period of time to said threshold.

16. The system as recited in claim 15, wherein said processor further comprises:

circuitry for switching said standard of operation from using said 802.11n standard to said standard that uses said lower bandwidth if said incremented tracked number of requests to hold back 802.11n traffic exceeds said threshold.

17. The system as recited in claim 13, wherein said processor further comprises:

circuitry for holding back 802.11n traffic if said number of requests to hold back 802.11n traffic does not exceed said threshold.

18. The system as recited in claim 13, wherein said standard of operation is switched from said 802.11n standard to one of 802.11a standard, 802.11b standard and 802.11g standard if said number of requests to hold back 802.11n traffic exceeds said threshold.

* * * * *